United States Patent [19]

McCartney, Jr. et al.

[11] Patent Number: 4,780,378
[45] Date of Patent: Oct. 25, 1988

[54] BATTERY VENT VALVE

[75] Inventors: Charles P. McCartney, Jr., Yorktown; Charles C. Montgomery, Alexandria; Clarence A. Meadows, Muncie; Bruce A. Cole, Anderson, all of Ind.

[73] Assignee: General Motors Corporation, Detroit, Mich.

[21] Appl. No.: 92,131

[22] Filed: Sep. 2, 1987

[51] Int. Cl.$^4$ .............................................. H01M 2/12
[52] U.S. Cl. ........................................ 429/54; 429/55; 137/843; 137/853
[58] Field of Search ........................... 429/53, 54, 55; 137/843, 844, 846, 847, 853

[56] References Cited

U.S. PATENT DOCUMENTS

| | | | |
|---|---|---|---|
| 2,713,953 | 7/1955 | Jewell | 137/853 |
| 3,601,152 | 8/1971 | Kenworthy | 137/843 |
| 4,189,033 | 2/1980 | Katsumori | 137/853 |
| 4,576,879 | 3/1986 | Nakazawa et al. | 429/86 |

FOREIGN PATENT DOCUMENTS 0017856 1/1985 Japan ...................................... 429/54

Primary Examiner—Donald L. Walton
Attorney, Agent, or Firm—Lawrence B. Plant

[57] ABSTRACT

A relief/check valve for venting an electric storage battery comprising essentially an annular sealing member having an elastomeric skirt engaging the sloping exterior surface of a valve seat. The skirt flares outwardly from the seat in direct proportion to the pressure in the battery such as to prevent excessive build up of pressure in the battery when the gassing rate is high. The skirt quickly returns to a sealing condition when the pressure within the battery drops below the opening pressure of the valve.

6 Claims, 3 Drawing Sheets

BATTERY VENT VALVE

This invention relates to valves for venting electric storage batteries.

BACKGROUND OF THE INVENTION

Sealed batteries are well known in the art and typically include a relief/check valve for venting gases generated within the battery when the internal pressure exceeds a predetermined superatmospheric level. Nickel-zinc batteries, for example, commonly operate with a positive internal pressure of about one half pound per square inch or more to promote oxygen recombination within the battery and to keep $CO_2$ in the air from contaminating the electrolyte when the pressure in the cell falls below zero psig. Similarly gas recombination type lead-acid batteries are known to operate at internal pressures ranging from about ½ psig to about 50 psig (i.e., depending on the particular application) to promote the oxygen recombination reaction and to exclude ambient oxygen from the battery. It is necessary for the prolonged life of such batteries that after the gases have been vented the relief/check valves close and reseal as near as possible to their opening pressure in order (1) to prevent unnecessary loss of the internal gases otherwise available for recombination and (2) to prevent any influx of ambient atmosphere into the battery as the internal pressure within the battery falls.

Under uncontrolled recharge, batteries can generate so much gas that the internal pressure can rapidly exceed the design pressure of the container unless the check valves are capable of quickly dumping or venting relatively large volumes (i.e., liters per minute) of the gases at relatively low internal pressures. For example, under high rate charge conditions such as can occur with a full field charge from an unregulated automobile generator/alternator or with other faulty charging equipment, some lead-acid batteries can generate more than 10 times the amount of gas otherwise generated under normal charging conditions.

Some valves commonly used in batteries do not actually reseal again until pressures as low as 25% or less of their opening pressure are reached. In fact, some such valves tested by Applicant's assignee did not reseal until the pressure in the battery had dropped below zero psig. Moreover, valves designed for rapid resealing at relatively high pressures do not usually have a capability for low pressure dumping of large volumes of gas and vice versa. No commercially available battery check valve has been found which provides both rapid, effective resealing near the opening pressure thereof as well as a high gas volume venting capability at relatively low internal pressures. In this latter regard, all of the commercial valves tested produced pressure build ups which were significantly more than twice the opening pressure of the valve in order to dump high volumes of gas.

Accordingly, it is an object of the present invention to provide a unique, compact, relief/check valve for venting an electric storage battery which valve is capable of resealing at pressures of at least about 50% or more of its opening pressure and of dumping relatively large volumes of gases under abnormal operating conditions without excessive build up of pressure within the battery container. This and other objects and advantages of the present invention will become more readily apparent from the detailed description thereof which follows.

BRIEF DESCRIPTION OF THE INVENTION

The present invention comprehends a check/relief valve for an electric storage battery which is capable of resealing at pressures of at least about 50% or more of its opening pressure and of releasing relatively large volumes of internal gases without excessive pressure build up within the battery. The valve of the present invention comprises a housing defining a vent chamber having a gas inlet for receiving gases from within the battery and an outlet for discharging them to the atmosphere. The housing includes a valve seat projecting into the chamber and having a sloping (preferably conical) exterior sealing surface. A sealing member circumscribes the inlet and includes an annular elastomeric skirt having a sealing edge circumferentially sealingly engaging the sealing surface of the seat. The elasticity of the skirt is selected based on the desired relief pressure sought for the battery under normal operating conditions and is such that the skirt will begin to flare radially outwardly when the desired pressure is reached so as to form an annular gap between the sealing edge of the skirt and the sealing surface of the seat through which the gases flow. Elasticity of the skirt, and hence the opening pressure of the valve, may be varied over a wide range by varying the dimensions of the skirt and the hardness (i.e., durometer) of the elastomer used.

The gases generated inside the battery act against the relatively large surface area on the inside of the skirt so as to cause outward flaring of the skirt at relatively low pressures. Under conditions where excessive gases are formed (e.g., run-away charging), the skirt will simply flare out further so as to increase the gap (i.e., the area of the flow path), between the skirt and the seat. Hence with only a slight increase in the diameter of the flared out skirt, the area of the gap through which the gas flows increases exponentially (i.e., by the square of the radius—$R^2$) so that much larger volumes of gas than normal can be vented without a significant increase in internal pressure. Vents made in accordance with the present invention have demonstrated the capability of dumping more than 10 times the normal volume of gases generated with a pressure build up of less than twice the opening pressure of the valve.

According to a preferred embodiment of the present invention, the opening pressure of the relief/check valve is adjustable by providing means for moving the sealing member to and fro with respect to the seat such that the skirt of the sealing member engages the sloping surface of the valve seat at different locations so as to prestress the skirt to various degrees and thereby vary the amount of pressure required to flare the skirt outwardly away from the seat.

DETAILED DESCRIPTION OF SPECIFIC EMBODIMENTS

The invention may better be understood when considered in conjunction with the following detailed description of certain specific embodiments thereof which is given hereafter in conjunction with the several drawings in which.

Figure 1:
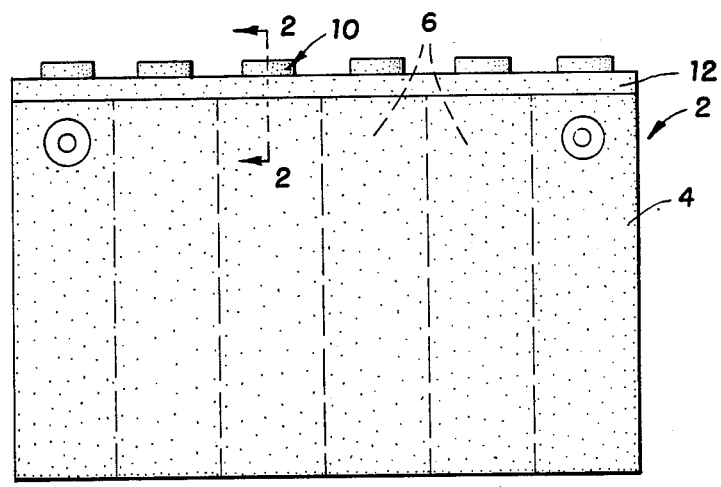
FIG. 1 is a side elevational view of an electric storage battery having vent valves in accordance with the present invention.

The Figures show a battery 2 having a container 4 divided into a plurality of individual cell compartments 6. Each compartment contains a cell element 8 comprising a plurality of alternately interleaved positive and negative polarity plates for electrochemically generating electrical current upon discharge of the battery and which generate gases (e.g., $H_2$ and $O_2$) on recharge, which gases are recombined within the cell as is well known in the gas recombination battery art. A vent 10 is provided in the cover 12 of the container 4 which vent 10 includes a check/relief valve 14 which is described in more detail hereinafter.

The relief valve 14 includes a housing 16 defining a venting chamber 18 and having a valve seat 20 at its lower end. The housing 16 may be integral with the cover 12 as shown in the drawings or may be discrete for positioning in an aperture in the cover (not shown). The valve seat 20 has a sloping (preferably conical) external sealing surface 22 for engagement by an annular skirt 24 on the depending elastomeric tubular sealing member 26. The elastomeric tube 26 will comprise a rubber-like material such as Shell Oil Co.'s styrene-butadiene materials, sold under the name Kraton TM, or the like. The tubular sealing member 26 is secured to a bulbous stud 28 depending from a plug 30 which serves to close off the vent chamber 18 from the ambient atmosphere surrounding the battery. Exhaust ports 32 in the plug 30 allow gases to escape from the vent chamber 18 to the ambient atmosphere.

An inlet opening 34 passing through the center of the seat 20 serves to communicate the vent chamber 18 with the battery cell compartment 6. In the particular embodiment shown in FIG. 2, the plug 30 is threaded into the housing 16 so as to permit adjustment of the opening and closing pressure of the tubular valve member 26 by advancing the member 26 to and fro with respect to the seat 20 such that the skirt 24 can locate at different sites along the sloping surface 22 of the seat 20 so as to diametrically prestress the skirt 24 to different degrees and thereby change its opening and closing (i.e., flaring) characteristics. The ability to adjust the opening pressure of the valve is particularly useful during the design phase of a battery as a means to readily adjust the pressure in the cell to optimize the recombination reaction. The adjustability feature is likewise advantageous during the commercialization phase of the battery as a means to provide a standardized vent assembly which may simply be set to different opening pressures as may be required for different battery models and/or applications.

Figure 2:
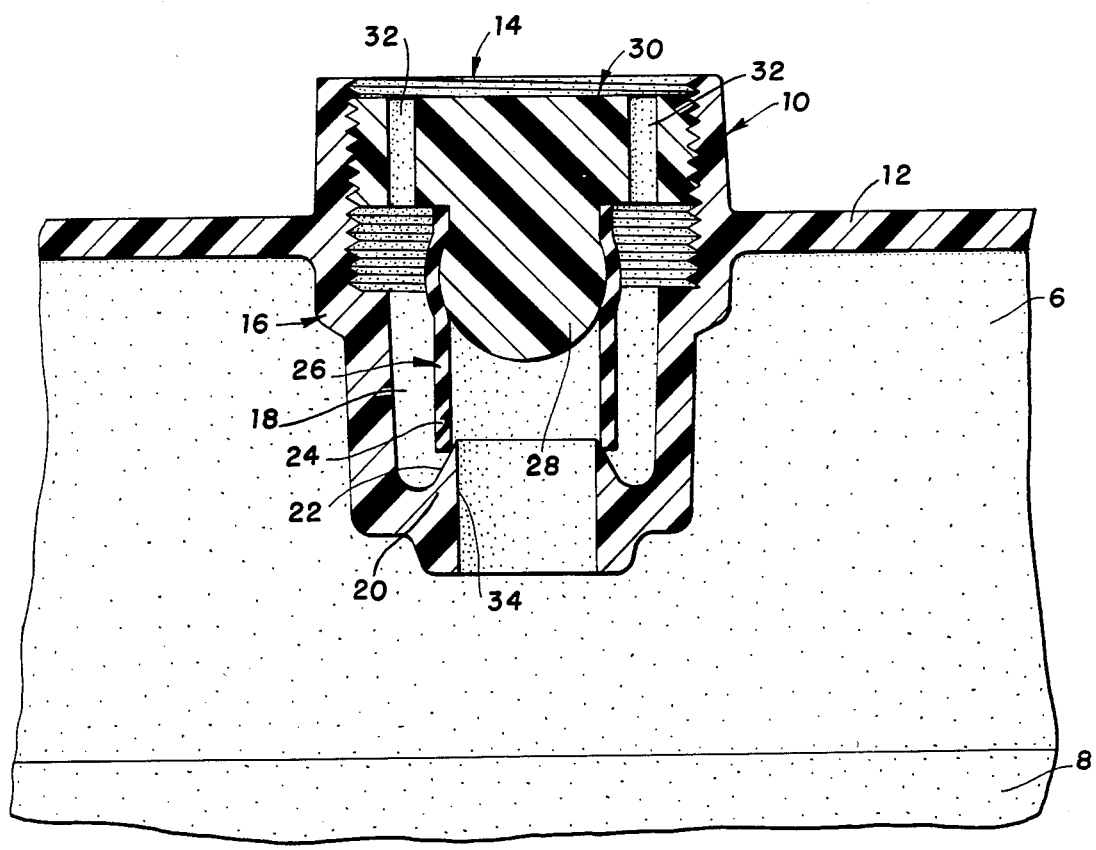
FIG. 2 is an enlarged section of a check/relief valve taken in the direction 2—2 of FIG. 1.
Figure 3:
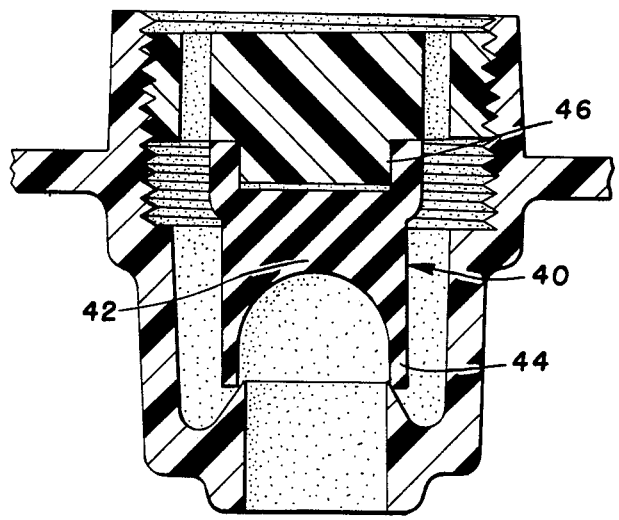
FIG. 3 is a view similar to FIG. 2 of another embodiment of a relief valve in accordance with the present invention.
Figure 4:
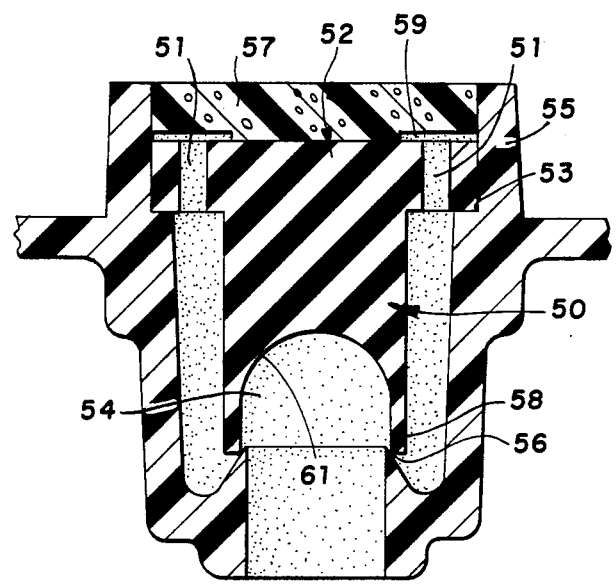
FIG. 4 is a view similar to FIG. 2 of still another embodiment of a relief valve in accordance with the present invention showing the valve member in the seated or closed condition.

The embodiment shown in FIG. 3 is similar to that of FIG. 2 except that the tubular sealing member 40 includes a central elastomeric web portion 42 proximate the skirt 44 which serves to insure that the gas vents at the skirt 44 rather than leaking out around the mounting stud 46. Moreover, the domed shape and location of the web 42 relative to the skirt 44 permits precise tailoring of the valve member's opening and closing pressures.

Figure 5:
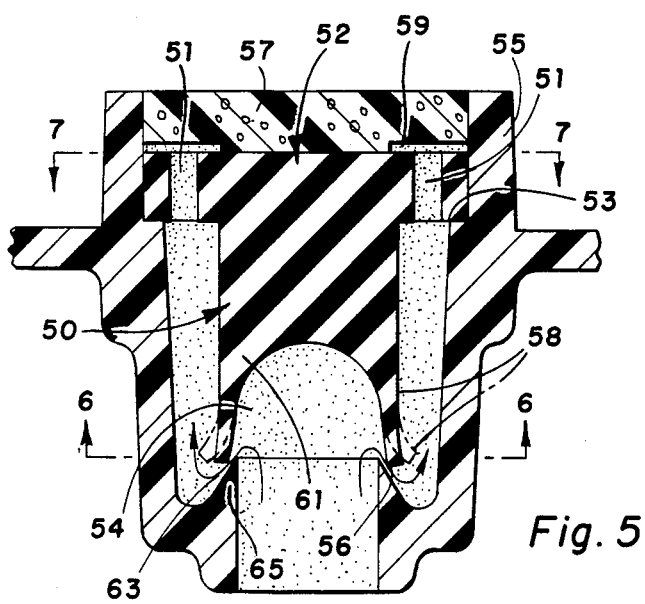
FIG. 5 is essentially the same as FIG. 4 except that the valve member is shown in the unseated or open condition(s)
Figure 6:
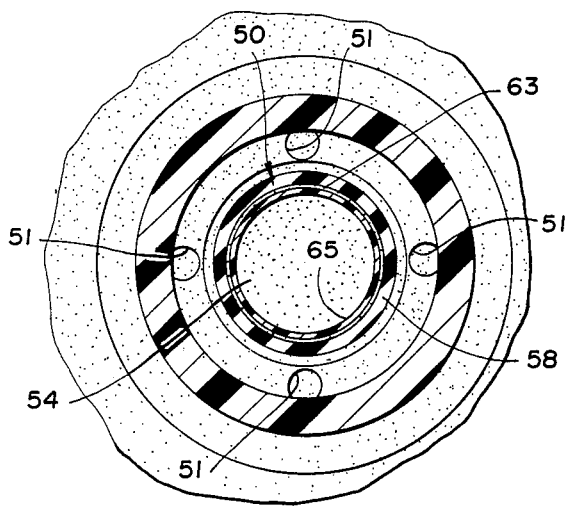
FIG. 6 is a view in the direction 6—6 of FIG. 5.
Figure 7:
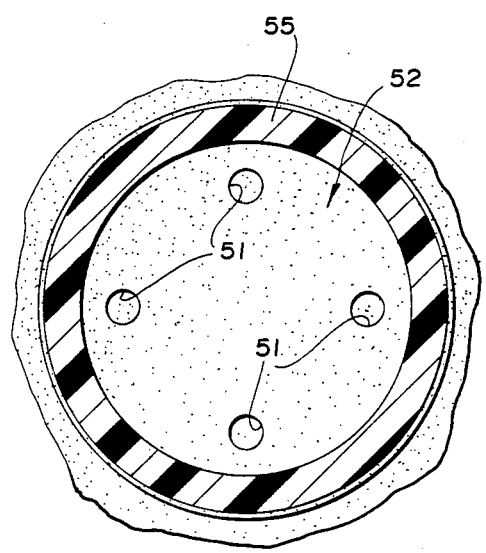
FIG. 7 is a view in the direction 7—7 of FIG. 5.

FIGS. 4–7 depict another embodiment of the present invention wherein the sealing member 50 is integrally molded with the plug portion 52 and includes a hemispherical cavity 54 above the sealing edge 56 of the skirt 58. The plug 52 is seated on shoulder 53 on the inside of the housing 55 and is held in place by a porous flame arrestor pellet 57 suitably secured in place as is well known in the art. An annular space 59 between the pellet 57 and the plug 52 forms a plenum for the gases exiting the exhaust ports 51 to spread out for more uniform passage through the flame arrestor 57. The hemispherically domed cavity 54 in the sealing member 50 provides a skirt 58 which is thicker near its top 61 than at the sealing edge 56 (i.e., its thickness decreases in the direction of the sealing edge) which serves to focus the opening action substantially at the sealing edge 56 (see FIG. 5) and helps prevent bulging, rather than flaring, of the skirt 58. A similar result is obtained by providing a skirt whose thickness tapers toward the sealing edge as would result, for example, by replacing the hemispherically domed cavity 54 with a frusto conically shaped cavity. FIG. 5 depicts opening/flaring of the skirt 58 under normal gassing conditions in solid lines and opening/flaring of the skirt 58 under high gassing conditions in phantom lines. The opening/flaring of the skirt 58 provides an annular gap 63 between the skirt 58 and the seat 65 through which the gases flow.

Figure 8:
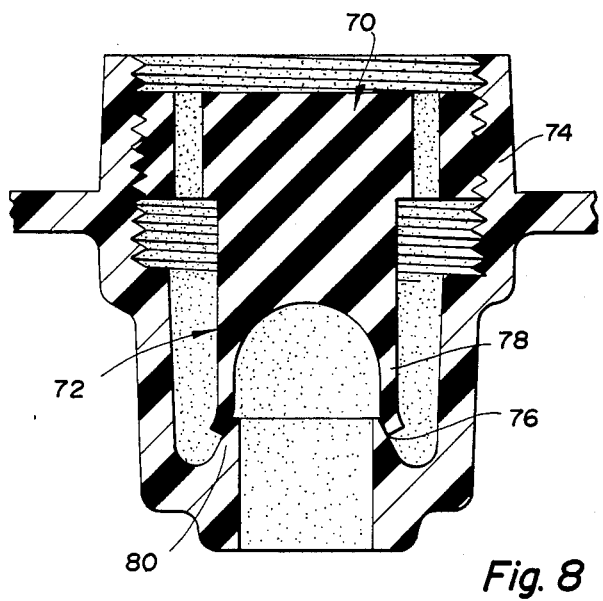
FIG. 8 is a view similar to FIG. 2 of still another embodiment of the present invention and showing the valve member's skirt seated more deeply on the valve seat.

FIG. 8 depicts an embodiment of the present invention wherein the plug 70 is integral with the sealing member 72 and is adapted to be screwed into the housing 74 to provide the adjustable feature discussed above. As shown, the sealing edge 76 of the skirt 78 is further down on the seat 80 so as to prestress the skirt and thereby increase the pressure at which the skirt will flare outwardly.

Figure 9:
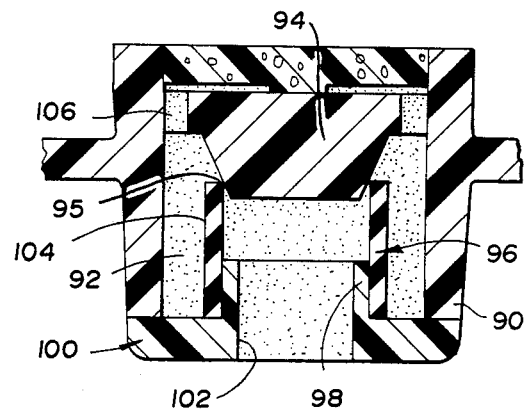
FIG. 9 is a view like that of FIG. 2 but of still another embodiment of the present invention.

FIG. 9 depicts still another embodiment of the present invention wherein the housing 90 defines a vent chamber 92 having a valve seat 94 at the exhaust end thereof and a sealing member 96 secured to a hollow cylindrical stud 98 on an end piece 100 at the inlet side of the chamber 92. An opening 102 through the stud 98 serves as the inlet for the gases to the venting chamber 92 from the cell compartment. The sealing edge 95 on the skirt 104 engages the seat 94 in close proximity to the exhaust ports 106 as shown. The tubular elastomeric sealing member 96 may conveniently be glued or otherwise permanently secured to the cylindrical stud 98 so as to insure that all the valving action occurs at the seat 94.

In accordance with one specific example of the present invention, a valve substantially as shown in FIG. 3 and adapted to open at about 2.75 psig and close at about 2.25 psig was made from a valve member comprising a 50—50 mixture of 45 durometer and 28 durometer Kraton TM and having an outside diameter of 0.38 inches, an inside diameter of 0.28 inches and a skirt length of 0.1 inches (i.e., as measured from the center of curvature of the hemispherical portion). The sealing member engaged a conical seat whose walls sloped downwardly at an angle of 30 degrees from the vertical axis. Valves so made are capable of dumping up to 14 liters/minute of gas at internal pressures of 5 psig or less.

While the invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. In an electric storage battery comprising (1) a container defining a compartment containing gas-generating electrochemical means for producing an electric current, and (2) check/relief valve means operatively associated with said container upon closing to isolate said electrochemical means from the ambient atmosphere and upon opening to vent said compartment when the internal pressure of the gas generated in said compartment exceeds a predetermined superatmospheric pressure the improvement wherein said valve comprises:

a housing defining a vent chamber and including a valve seat projecting into said chamber, said seat having a sloping exterior sealing surface;

an inlet in one eand of said housing for admitting gas into said chamber from said compartment;

means for exhausting said gas from said chamber to the environment; and a sealing member in said chamber circumscribing said inlet for controlling the internal pressures at which said opening and closing occurs and, as necessary, for dumping relatively large volumes of said gas without excessive build-up of said internal pressure in said container, said sealing member comprising an annular elastomeric skirt secured at one end and having a tubular portion extending from said one end above said inlet so as to provide an internal annular surface exposed to said internal gas pressure and a sealing edge on the interior of the other end of said tubular portion circumferentially sealingly engaging said sloping exterior sealing surface when said valve is closed, said skirt being adapted to be responsive to said internal gas pressure acting on said internal surface so as to (a) flare substantially uniformly radially outwardly open at said predetermined internal pressure to provide an annular gap between said edge and said sealing surface for passing relatively low volumes of said gas into said chamber and thence to the environment under normal operating conditions, (b) flare further outwardly open so as to enlarge the cross sectional area of said gap exponentially to pass significantly more said gas under abnormal operating conditions without a significant build-up of said internal pressure above said predetermined pressure, and (c) rapidly return to said closed sealing engagement by the time said internal pressure has fallen to about 50% or more of said predetermined pressure.

2. In an electric storage battery comprising (1) a container defining a compartment containing gas-generating electrochemical means for producing an electric current, and (2) check/relief valve means operatively associated with said container upon closing to isolate said electrochemical means from the ambient and upon opening to vent said compartment when the internal pressure of the gas generated in said compartment exceeds a predetermined superatmospheric pressure the improvement wherein said valve comprises:

a housing defining a vent chamber;

an inlet in one end of said housing for admitting gas into said chamber from said compartment, said inlet being surrounded by a valve seat having a sloping exterior sealing surface;

a closure member for closing off said chamber at the other end of said housing;

means for exhausting said gas from said chamber to the environment; and a sealing member depending from said closure member into said chamber for controlling the internal pressures at which said opening and closing occurs and as necessary for dumping relatively large volumes of said gas without excessive build-up of said internal pressure in said container, said sealing member comprising an annular elastomeric skirt secured at one end, and having a tubular portion extending from said one end above said inlet so as to provide an internal annular surface exposed to said internal gas pressure and a sealing edge on the interior of the other end of said tubular portion circumferentially sealingly engaging said sloping exterior sealing surface when said valve is closed, said skirt being adapted to be responsive to said internal gas pressure acting on said internal surface so as to flare substantially uniformly radially outwardly open at said predetermined internal pressure to provide an annular gap between said edge and said sealing surface for passing said gas into said chamber and thence to the environment under normal operating conditions, (b) flare further outwardly open so as to enlarge the cross sectional area of said gap exponentially and pass significantly more said gas under abnormal operating conditions without a significant build-up of said internal pressure above said predetermined pressure, and (c) rapidly return to said closed sealing engagement by the time said internal pressure has fallen to about 50% of said predetermined pressure.

3. A storage battery according to claim 2 wherein said sloping exterior surface has a substantially conical shape.

4. A storage battery according to claim 2 wherein said closure member is separate from said housing and is adapted for axial, to-and-fro movement within said housing with respect to said seat to vary the situs of the engagement of said edge of said surface and thereby vary said predetermined pressure.

5. A storage battery according to claim 1 wherein the thickness of said skirt decreases in the direction of said sealing edge.

6. A storage battery according to claim 2 wherein the thickness of said skirt decreases in the direction of said sealing edge.

* * * * *